United States Patent
Strobel

(10) Patent No.: US 6,290,160 B1
(45) Date of Patent: Sep. 18, 2001

(54) BELT RETRACTOR

(75) Inventor: Ralf Strobel, Schwäbisch Gmünd (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/573,431

(22) Filed: May 16, 2000

(30) Foreign Application Priority Data

May 18, 1999 (DE) .......................................... 299 08 716 U

(51) Int. Cl.[7] .............................. B60R 22/38; B65R 75/48
(52) U.S. Cl. ...................... 242/383; 242/382.4; 180/268; 280/807; 200/61.58 SB
(58) Field of Search ................................... 242/371, 383, 242/382.4; 200/61.58 B, 61.58 SB; 280/807; 180/268; 287/35; 297/477

(56) References Cited

U.S. PATENT DOCUMENTS 5,501,293 * 3/1996 Borjesson ............................ 180/268
5,765,774 * 6/1998 Maekawa et al. ................ 242/390.9

* cited by examiner

Primary Examiner—Donald P. Walsh
Assistant Examiner—Jonathan R. Miller
(74) Attorney, Agent, or Firm—Tarolli, Sundheim, Covell, Tummino & Szabo L.L.P.

(57) ABSTRACT

A belt retractor has a frame (1; 101), a belt reel rotatably mounted about an axis in the frame, a control disc (10; 110) coaxial with the belt reel and a reduction gear unit (7, 15, 16) which translates rotation the belt reel into a reduced rotation of the control disc. The control disc has a cutout window (11; 111) between a pair of detector elements. The first (8; 108) of these detector elements is connected to the belt reel for joint rotation and the second (12; 112, 113, 114, 115, 116) is arranged as fixed relative to the frame. The window is located on the same radius as said detector elements relative to the axis. The arrangement provides a precise measurement of the absolute angle of rotation of the belt reel.

11 Claims, 3 Drawing Sheets

BELT RETRACTOR

The present invention relates to a belt retractor comprising a frame, a belt reel rotatably mounted about an axis in the frame, a control disc coaxial with the belt reel and a reduction gear unit which translates the angle of rotation of the belt reel into a reduced angle of rotation of the control disc.

BACKGROUND OF THE INVENTION

In a belt retractor the total range of angular rotation of the belt reel is dictated by the condition of the belt webbing in its fully coiled and fully uncoiled condition. Within this range of angular rotation various relationships exist between the absolute angle of rotation of the belt reel and characteristic conditions of the belt system. Thus, zero angle of rotation (belt webbing fully coiled) is an indication that the belt is not in use. At maximum angle of rotation (belt webbing fully uncoiled) a switching action may be introduced to translate the belt retractor into the automatically blocked condition which is suitable for example for restraining loads or child seats. Between these extreme positions various characteristic conditions may be defined which, where necessary, in conjunction with other parameters, more particularly seating posture, seat occupancy and the like, may be associated with special switching positions in which activating various switching actions is expedient, it being especially desirable for the system to "see" the conditions in which activation of an air bag is to be inhibited, examples of which are the use of child seats, incorrect seated posture (leaning forward) and belt buckled with seat empty. Recognizing such conditions is only possible with adequate reliability when the angle of rotation of the belt reel can be sensed with high accuracy. It is known (e.g. DE 298 20 086.4) to translate the total range of angular rotation of the belt reel by means of a reduction gear unit to a single revolution of an indexing disc. Since, however, the absolute angle of rotation of the belt reel is a multiple of 360°, each angle on the indexing disc corresponds to an accordingly greater angular range of the belt reel rotation so that the indexing positions cannot be sensed with the desired accuracy.

BRIEF SUMMARY OF THE INVENTION

The invention makes available a belt retractor of the aforementioned kind in which the absolute angle of rotation of the belt reel may be established with high accuracy by uncomplicated technical means. In the belt retractor in accordance with the invention the control disc comprises at least one cutout window between two detector elements, the first of which detector elements is non-rotatably connected to the belt reel and the second of which is arranged non-rotatable relative to the frame, the window provided on the same radius relative to the axis as these sensor elements. When a detector element arranged on the belt reel arrives at a position opposite the frame-fixed detector element, a signal pulse is generated, but only then when the window of the control disc is located between the sensor elements to thus permit communication between them. The control disc and the window therein thus permit selection of a portion of the range of total angle of rotation of the belt reel, it being within this selected range of angular rotation which may correspond more particularly to one full revolution of the belt reel, that the absolute angle of rotation of the belt reel is sensed without any reduction by a gear since the detector elements produce a pulse precisely then when the sensor on the belt reel is located opposite to the sensor fixed to the frame.

By providing a plurality of detector elements distributed about the circumference of the belt reel in the preferred embodiment of the belt retractor various rotary positions may now be reliably and precisely sensed within an absolute revolution of the belt reel.

In a preferred further embodiment of the belt retractor a plurality of detector elements are arranged on the same radius and non-rotatable with respect to the frame. With a suitable number of detector elements fixed to the frame, each of which is capable of sensing a full revolution of the belt reel, all relevant rotary positions of the belt reel may be sensed with high accuracy.

Further features and advantages of the invention read from the following description and are evident from the drawings illustrating by way of example an embodiment of the invention and to which reference is made in the description.

BRIEF DESCRIPTION ON THE DRAWINGS

DETAILED DESCRIPTION OF THE PREFERRED EMBODIMENTS

Figure 1:
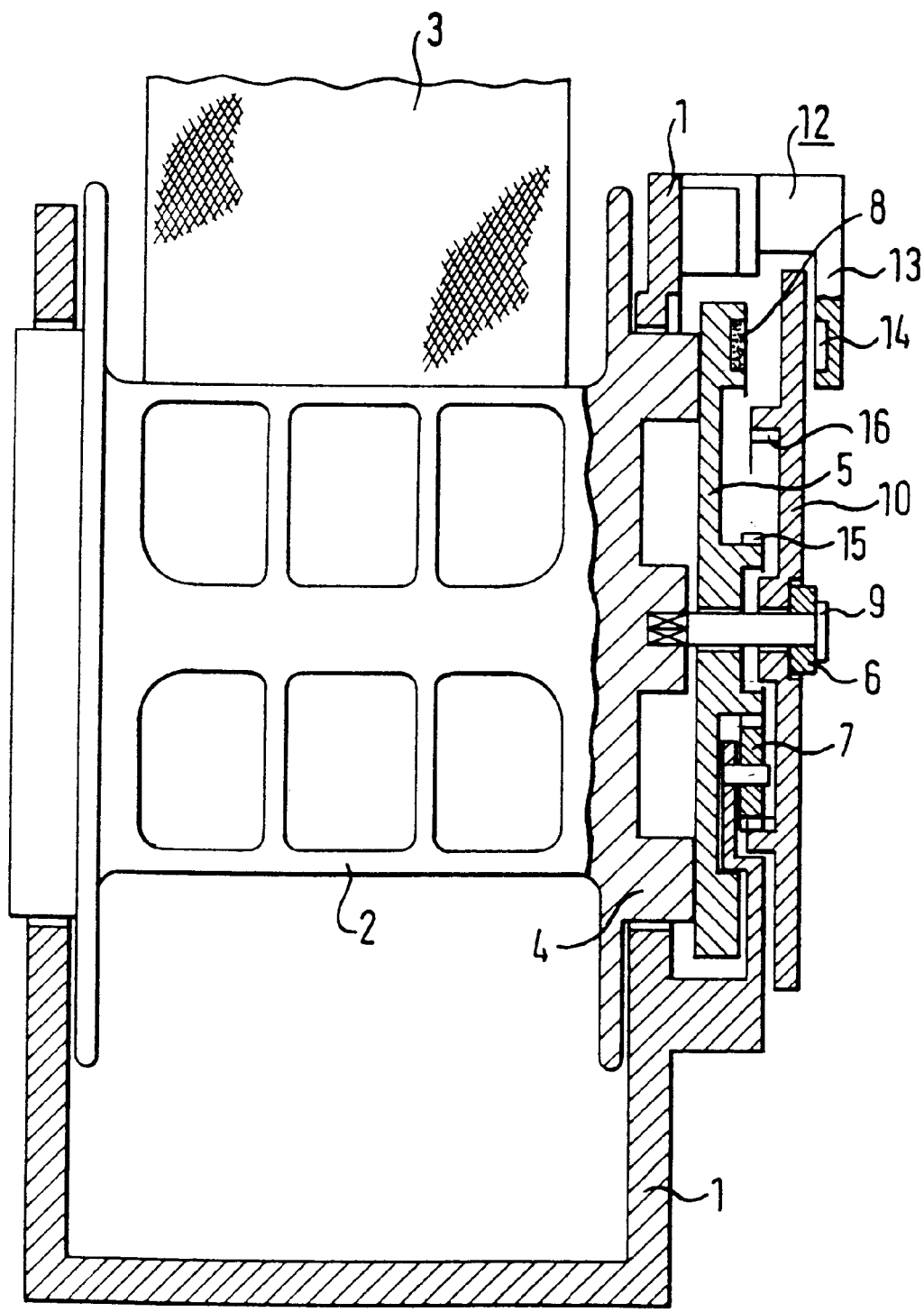
FIG. 1 is a cross-section through an embodiment of a belt retractor in accordance with the invention.
Figure 2:
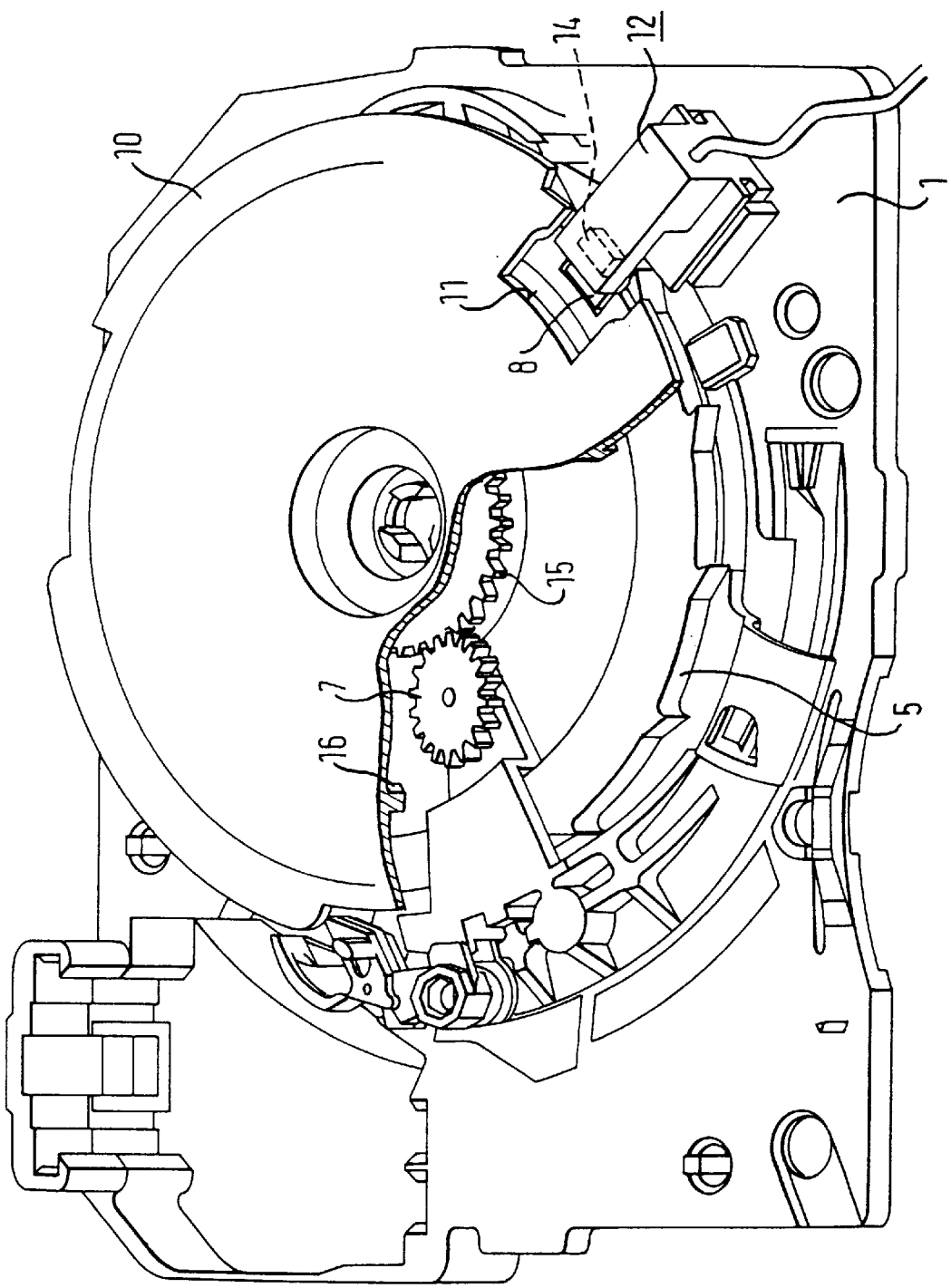
FIG. 2 is a partially sectioned view of a detail of the belt retractor as shown in FIG. 1.

Referring now to FIGS. 1 and 2 there is illustrated an embodiment of a belt retractor in accordance with the invention comprising a belt reel 2 mounted in a frame 1, the belt webbing 3 being coiled on the belt reel 2. Fitted to a flange 4 of the belt reel 2 is a coupling disc 5 comprising an upper side and an underside, the underside facing the flange 4. Formed on the outer circumference of the coupling disc 5 are teeth suitable for engaging, by known ways and means, a sensor lever of a locking device for blocking the belt reel. On the upper side of the coupling disc a concentric recess is formed on the inner edge of which likewise teeth 15 are configured, these teeth engaging an intermediate gear 7 rotatably mounted about its axis on the frame 1. Provided on the upper side of the coupling disc 5 in a window in the vicinity of the edge is a magnet 8 as a moved sensor element. Mounted as a pressed fit in an axial hole in the axis of the flange 4 is a pin 9 on which a control disc 10 is rotatably mounted and is locked in place axially by a cone 6 at the end of the pin. The control disc 10 is made of a magnet shielding material, e.g. iron, and comprises on its side facing the belt reel 2 a flange, at the inner circumference of which in turn teeth 16 are configured engaging the intermediate gear 7. Provided at the outer edge of the control disc is a rectangular window 11. Fitted to the frame 1 is a fixed sensor element 12 which in this case consists of a locator including an arm 13 extending over the control disc 10, a Hall sensor 14 being provided at the end of the arm 13.

When the belt webbing 3 is uncoiled, the belt reel 2 and thus also the coupling disc 5 is rotated in the frame 1. The angle of rotation of the coupling disc 5 is translated via the intermediate gear 7 into a predetermined smaller angle of rotation of the control disc 10, similar to the translation between the hour and minute hands of a clock. The magnet 8 or, the coupling disc 5, the window 11 in the control disc 10 and the Hall sensor 14 in the fixed sensor element 12 are all located on the same radius with respect to the axis of the belt reel 2. When the belt webbing 3 is uncoiled, the magnet 8 in the coupling disc 5 moves several times past the Hall sensor without producing a signal as long as the sensor is shielded by the control disc 10. It is only when the magnet 8, the window 11 in the control disc 10 and the fixed sensor element 12 with its Hall sensor 14 are aligned with each other that a signal is generated. So that no ambiguity exists it is not allowed that control disc 10 and coupling disc 5 assume the same position twice relative to the frame and relative to each other over a range of full withdrawal of the belt webbing. This is ensured by selecting the translation ratio between coupling disc 5 and control disc 10 so that that the control disc 10 has executed somewhat less than a full revolution on full withdrawal of the belt webbing 3, or that at least the magnet 8 on the coupling disc 5 does not pass the Hall sensor 14 again on the last revolution of the coupling disc 5. In addition, in the circumferential direction the window 11 must not be wider than 360° divided by the number of revolutions of the coupling disc 5. Then, the withdrawal position of the belt webbing 3 can be precisely sensed by this arrangement.

Instead of the combination of magnet and Hall sensor other detector element arrangements may be put to use, of course, for example a fixed reflector photocell and an arrangement of alternating reflecting and opaque zones applied to the coupling disc.

By employing a plurality of fixed and movable sensor elements applied at various angular positions, many different withdrawal positions of the belt webbing may be each defined.

Figure 3:
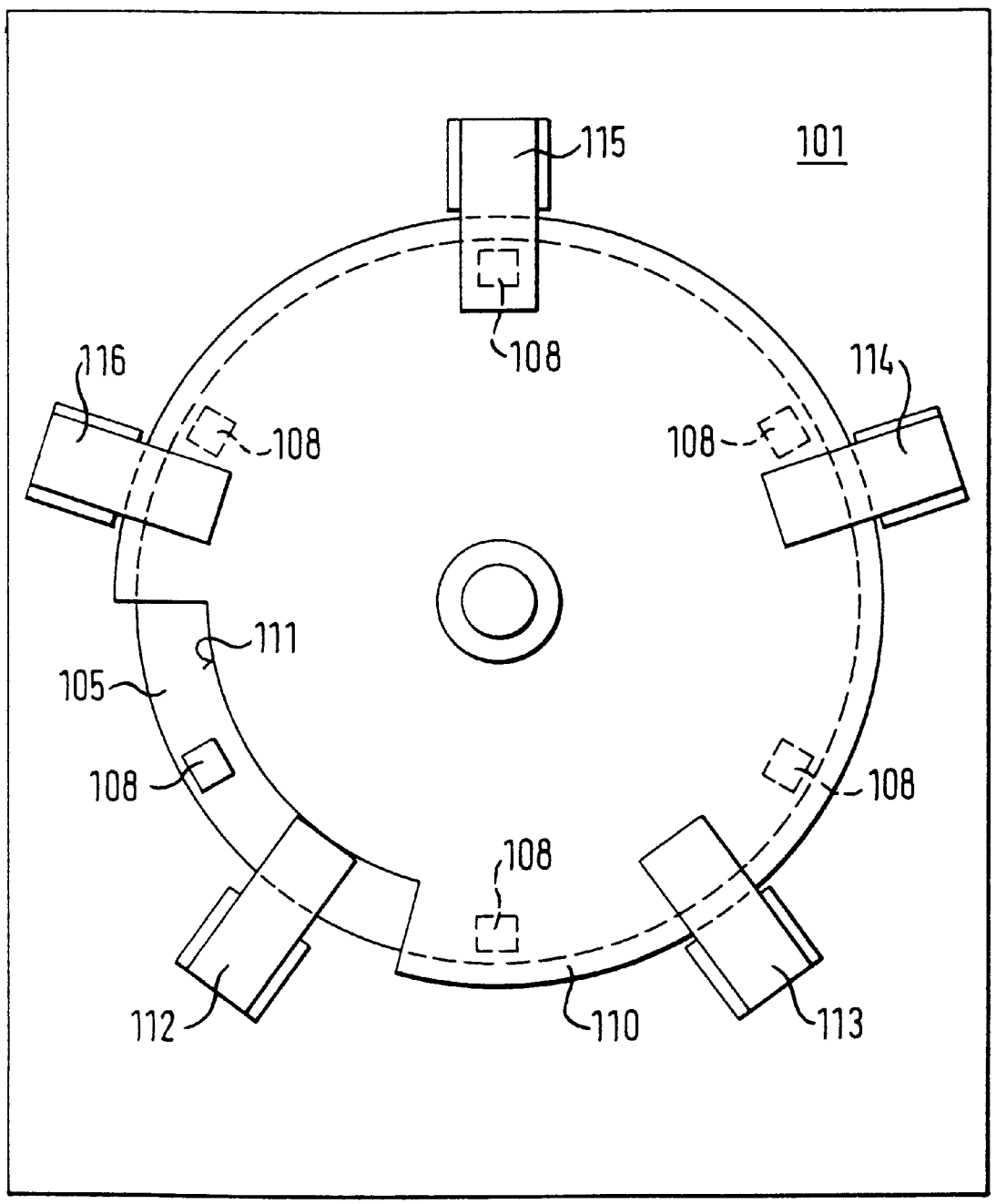
FIG. 3 is a schematic illustration of an arrangement of sensor elements for a belt retractor in accordance with the invention.

Referring now to FIG. 3, there is illustrated for example an arrangement in which six detector elements 108 are uniformly, distributed about the full circumference of the coupling disc 105. Five fixed sensor elements 112, 113, 114, 115, 116 are uniformly applied along the circumference of the frame 101. In this arrangement the belt reel and thus the coupling disc 105 execute five revolutions over the full withdrawal of the belt webbing, these five revolutions being reduced by the gearing into a single revolution of the control disc 110 with the window 111. During the first revolution of the coupling disc 105 the window 111 of the control disc 110 is positioned under the fixed sensor element 112 resulting in this sensor element detecting six signals in sequence as triggered by the six passing detector elements 108. When the coupling disc 105 continues moving in the same direction, the next six signals are detected by the fixed sensor element 113 since the window 111 has since moved further to the sensor element 113. In this arrangement each of the five revolutions of the belt reel is reflected by an angular range of 60°, thereby enabling 30 positions to be sensed. It is not a mandatory requirement in this arrangement that the detector elements be arranged uniformly, when e.g. any particular positions need to be sensed.

It is also possible to make use of a plurality of moved detector elements and a corresponding number of fixed sensor elements on different radii, even more positions being obtained by combining the resulting signals. The more positions sensed, the more accurate is a vehicular restraint system control, for instance, in conjunction with a contact in the belt buckle able to "see" whether a situation exists in which activating an air bag or a belt tensioner would be useless or even dangerous, due to the seat being vacant or occupied by a child's seat, or because the seat occupant happens to be leaning forward at the time in a so-called OOP (out of position) condition.

What is claimed is:

1. A belt retractor comprising a frame, a belt reel rotatably mounted about an axis in said frame, a control disc coaxial with said belt reel and a reduction gear unit which translates angles of rotation of said belt reel into reduced angles of rotation of said control disc, wherein said control disc comprises at least one window, a first element of a detector pair being connected to said belt reel for joint rotation and the second element of said detector pair being arranged as fixed relative to said frame, and said window being located on a same radius as said detector pair elements relative to the axis.

2. The belt retractor as set forth in claim 1, wherein said belt reel has a total range of angular rotation substantially corresponding to one revolution of said control disc.

3. The belt retractor as set forth in claim 1, wherein said window of said control disc has a width, as measured in a circumferential direction of the belt reel, which substantially corresponds to one revolution of said belt reel.

4. The belt retractor as set forth in claim 1, wherein a plurality of detector pair elements are arranged on said belt reel so as to be distributed about the circumference thereof.

5. The belt retractor as set forth in claim 4, wherein said detector pair elements are distributed on said belt reel so as to be equally spaced about the full circumference.

6. The belt retractor as set forth in claim 1, wherein a plurality of detector pair elements are arranged as fixed with respect to said frame on a same radius.

7. The belt retractor as set forth in claim 6, wherein each of said detector pair elements arranged on said frame is associated with an absolute range of angular rotation of said belt reel.

8. The belt retractor as set forth in claim 7, wherein said absolute range of angular rotation corresponds to one complete revolution of said belt reel.

9. The belt retractor as set forth in claim 1, characterized in that said detector pair elements comprise optical sensor elements.

10. The belt retractor as set forth in claim 1, wherein said detector pair elements comprise magnetic sensor elements.

11. The belt retractor as set forth in claim 1, wherein said detector pair elements connected to said belt reel are passive detector elements.

* * * * *